June 5, 1962 T. F. PAULS 3,037,277
HOLLOW SHEET METAL FORMING
Filed Feb. 8, 1956 2 Sheets-Sheet 1

INVENTOR:
THERON F. PAULS
By John D. Wilkins & Lionel E. Goff
ATTORNEYS

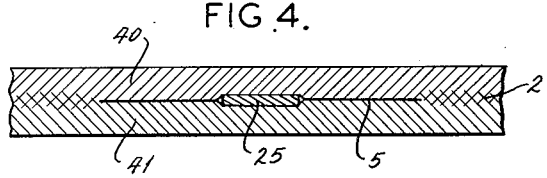
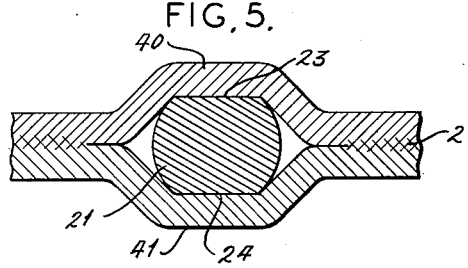
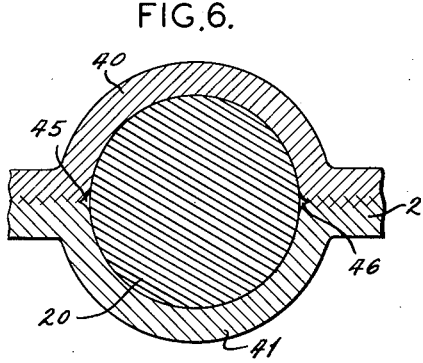
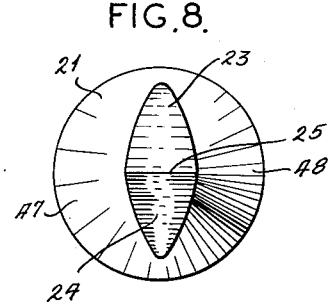
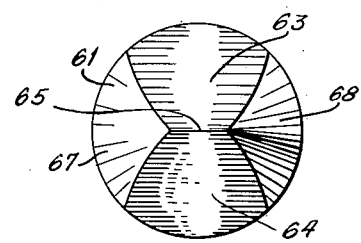
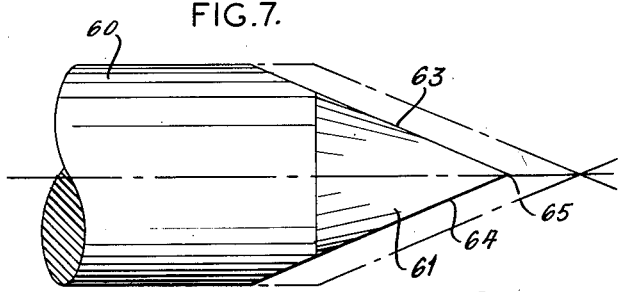

United States Patent Office 3,037,277
Patented June 5, 1962

3,037,277
HOLLOW SHEET METAL FORMING
Theron F. Pauls, Godfrey, Ill., assignor to Olin Mathieson Chemical Corporation, East Alton, Ill., a corporation of Virginia
Filed Feb. 8, 1956, Ser. No. 564,193
8 Claims. (Cl. 29—545)

This invention relates to the manufacture of sheet metal articles and more particularly to initial opening and manufacture of hollow articles of sheet metal by fluid pressure inflation.

One heretofore known method of making hollow articles of sheet metal involves inflation of parts of superposed component sheets between areas joined either in any conventional manner or in a special manner by pressure such as by roll welding. In the unjoined inflatable parts the interior surfaces of the component parts are maintained in separation during rolling according to one such particular advantageous method by the presence of a thin layer of weld preventing material also known as separation or "stop-weld" material. This weld preventing material is applied graphically in a pattern corresponding to a final inflated passageway in the sheet metal unit.

In order to inflate the unit along the embryonic or potential passageway part of the graphic pattern, the separation material is extended to an edge of the unit at which a pointed tool is ordinarily thrust in to make any suitable access opening at which fluid pressure connection may be made with the non-bonded passageway portion of the sheet metal unit. The inlet extension of the separation material is generally exposed for location and opening by shearing through the sheet at this point. This leaves the exposed material visible as a fine line or lamination so that after shearing one of the component sheets at the sheared portion adjacent the exposed lamination is pried from the other to initiate the formation of an opening. The opening heretofore has ordinarily been started and completed by driving a sharply pointed drift punch with one or a few heavy blows of an ordinary hammer or mallet and into the resulting access opening a suitable hollow inflation needle is then inserted just prior to injection of fluid pressure to accomplish elevation or erection of the tube or passageway portions of the heretofore flat but partially laminated sheets.

Driving in of the conventional pointed or other sharply edged drift punch or chisel by means of a relatively heavy blow in this way, or a few blows each of long penetration, all too frequently results in tearing, scoring, or breaking through of the sheet metal unit at the proposed inlet. This damaged laminated unit or panel must then be rejected as unfit for inflation unless a sufficient extension remains for another shearing operation to reestablish a new area for another attempt at making the proposed opening. In many instances an excess of extension may not be available and the punctured panel must be discarded. In any event, such undesirable breaking through is a disadvantage because of the resulting slow down, scrap loss and increase in expense of the manufacturing operation.

Therefore, one object of the present invention is to provide a speedy production method of establishing an opening into inflatable panels so as to provide a suitable tubular inlet with a minimum of scrap loss.

Another object is to provide apparatus adapted to make the desired opening in one step with reliability and without the disadvantage of mutilation and need for further trials to accomplish a suitable opening.

Other objects and advantages will become apparent from the description of a preferred embodiment, which follows, when taken in connection with the accompanying drawing in which:

FIG. 4 is a cross sectional view including the front end of the punch or needle taken on line IV—IV of FIGURE 2;

FIG. 5 is a cross sectional view taken on line V—V of FIGURE 2;

FIG. 6 is a cross-sectional view taken on line VI—VI of FIGURE 2;

FIG. 7 is an enlarged side elevational view of another embodiment of the punch;

FIG. 8 is a front elevational view of the embodiment shown in FIGURES 1–6; and

FIG. 9 is a view from the front of the embodiment of FIGURE 7.

In accordance with this invention, the inlet extension of the separation stratum of an inflatable partially laminated sheet unit or panel is opened up where exposed at an edge by a series of relatively short but solid impacts predominantly unidirectionally applied but preferably vibratorily applied through a drift punch. Preferably a punch having a particular type of front end configuration is employed. It was found that when a punch was driven in with a vibratory motion so that entry was done in a multiplicity of short advances rather than in one or a few severe advances, consistently good opening at the inlet was obtained. Vibratory driving is especially advantageous since the body of the punch is not only put into motion in powerful but short longitudinal steps but is also put into lateral pulsation which periodically distends and contracts the body of the punch and facilitates penetration between the lips or plies of the panel instead of into one or the other of the plies. At least about 40 blows or vibrations to an inch of penetration is contemplated.

Although vibrations as low as about 1,000 or 1,500 or even somewhat less per minute may be employed for certain panel designs, for most production purposes, a frequency of vibration of about 8400 per minute or higher is preferred. Vibrations as high as supersonic frequencies may be advantageously employed.

Figure 1:
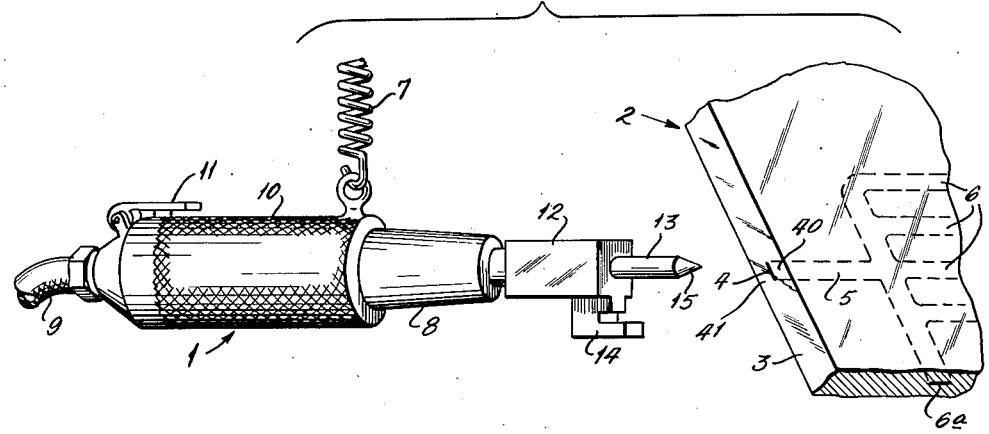
FIG. 1 is a side elevational perspective view showing apparatus in accordance with this invention together with a portion of an inflatable panel partially in cross section.

While the inlet remains unopened, the separation stratum, which ordinarily consists of a thin layer of weld preventing material, first presents itself when the panel is sheared to expose the separation stratum in the extension area as a mere line somewhat longer than the transverse dimension of the fully opened inlet opening at the extension. Since shearing of the panel is ordinarily done at an angle, the line is disposed between two lips of metal, one of which protrudes beyond the other. This line is easily discernable on the sloping cut surface as shown in FIGURE 1 and is adapted, when special tool 14 is applied, to be broadened to a somewhat oblong shape slot when the protruding lip 41 is bent from the receding lip 40.

It was found that the punch preferably should consist of a cylinder of somewhat lesser diameter than the diameter of the fully opened entry passage and that the interior portion of the punch should be tapered down conically toward a transverse leading edge which is not only of lesser diamension than the diameter of the punch, i.e. shorter than the base of the conical section, but also is considerably shorter than the exposed linear indication of the unopened inlet extension. A conical section having a base of lesser diameter than the diameter of the fully opened entry passage in the sheet and having instead of a sharp or rounded point a transverse leading edge shorter than the exposed linear indication of the extension was found advantageous. In practice, the desired form of drift punch consists of a cylindrical rod of metal, the front end of which has a portion tapered conically to a point in turn modified by opposing flats ground on the conical surface, each flat either in parallel with one of a pair of opposed generating elements of the cone or each flat at a more obtuse angle to the axis of the cone than such element. An included dihedral angle of about 40° between the flats was found particularly effective. However, this may be varied somewhat. Larger angles may be used with wider linear indications of openings in relatively thin, easily penetrated panels. Smaller angles may be used for smaller openings in relatively heavy gauge panels of stronger material. In any event, the included angle at the leading edge of the punch should be less than 90°. This form of construction of the drift punch point provides a profile found to be capable of not only readily entering at the linear exposure of the separation stratum but of also prying apart the metal on opposite sides of the opening with substantial elimination of the tendency of the point to puncture the metal rather than follow along the separation stratum.

A drift punch, preferably of this particular structure, in accordance with this invention is driven into the sheet metal unit in a relatively great number of short strokes each forming a minor increment of the entire extent of penetration. Driving of the punch is accomplished by a vibrating type of impact device acting on the punch in such a way that in each increment, the point penetrates only a small fraction of the complete insertion required to make a suitable opening. Generally speaking, more vibrations and a shorter advance per increment are desirable for all panels but especially for panels having easily punctured but difficultly separable lamina as compared to panels characterized by a lamination gauge and composition together with a separation stratum width calculated to make for relatively easy opening.

A hammer, such as a pneumatic or electric or magnetic hammer, having a weight in the range from about one pound to about 15 pounds and providing from about 10,000 blows per minute to about 1500 blows per minute may ordinarily be employed. Vibrating hammers of greater weight will ordinarily provide a lesser number of vibrations or blows, while the hammer of lesser weight is characterized by a higher frequency or blows per minute. For example, a hammer especially suitable for the purpose of this invention has a weight of about two pounds and provides 8400 blows per minute. The arrangement of vibrator and drift punch is disposed to drive the punch with a series of impacts preferably horizontally or at a gentle inclination into the sheet metal panel at the extension. The entire arrangement is supported in any suitable manner such as by means of a pendulum type of spring support or by the hand of the tool operator. With this type of arrangement, the force applied by each impact blow is of desired solidity and amounts to about twice the inertia weight of the hammer.

In operation, the punch is driven into the desired length of opening in a relatively great number of strokes. For example, to drive in a punch into the panel an inlet distance of about ¾ of an inch, there are applied from about 30 to about 50 blows, i.e. from about 40 to about 70 blows per inch of penetration. Thus, in accordance with this invention, opening is accomplished by increments of substantially not more than from about 0.015 of an inch to about 0.025 of an inch.

The desired number of strokes and increment of punch travel is determined to some extent by the gauge and composition of the sheet material of which the partially laminated panel is made and is also determined by the ratio of the linear exposure of the unformed inlet to the gauge. When operating with panels of lighter gauge, it is desirable that a hammer of lighter weight, greater frequency and lesser increment of punch travel be employed. On the other hand, with panels of heavy gauge, a heavier punch or lower frequency of blows and greater increment of travel is permissible. The composition of the panel also will have an influence. Easily punctured metal such as aluminum requires a greater number of lighter blows, whereas more difficultly puncturable metal such as steel will take fewer and longer heavy strokes of the punch. A two pound hammer providing 8400 blows per minute has been found suitable for an aluminum sheet metal panel having a gauge of about 0.062 of an inch. Although it is preferred that the drift punch and vibrating hammer arrangement of this invention accomplish opening in the horizontal direction, it is also within the contemplation of this invention that the opening be accomplished at not only an angle to the horizontal but also vertically provided the static weight of the tool be taken into account and the frequency of vibration adjusted accordingly.

In practice adjustment is made along the aforementioned lines until satisfactory operation is achieved.

In FIGURE 1 there is shown the opening forming tool 1 and a portion of an inflatable panel 2. One edge of the panel such as edge 3, has been sheared in accordance with the teachings of my patent application Serial No. 436,021 filed June 11, 1954, now U.S. Letters Patent 2,835,025 granted May 20, 1958, so as to advantageously reveal and present for opening the linear indication 4 of the extension 5 of the stop-weld pattern 6 carried internally of the inflatable panel 2 as shown at 6a of the cross section. Tool 1, which may be counterbalanced and is yieldably suspended in any suitable manner such as by means of spring 7, consists of a vibratory impact hammer 8 of any suitable type such as an air hammer to which operating fluid may be admitted through the flexible hose 9 and having a handle or hand grip 10 with an operating trigger 11. Mounted on the tool 8 in the front end for the purpose of holding a punch is a tool block 12 the operating end of which carries the specially constructed opening forming punch 13. The tool may be of a compound type as shown in FIGURE 1 where the operating end of the block 12 is shown to carry, in addition to punch 13, a slot and jaw arrangement 14 of the type adapted to operate on the protruding lip of the sheared edge 3 of the panel 2 adjacent the linear indication 4 of the extension so as to pry apart one portion of the panel adjacent the linear indication prior to presentation of punch 13. This jaw 14 and the procedure is described in aforementioned Serial No. 436,021.

In operation, the point 15 of the special punch 13 is pressed into the linear indication 4 at sloping edge 3 and the operator, after initiating vibratory motion of the hammer 8, thrusts the needle 13 against the panel 2 until the extension 5 is opened to a suitable depth of penetration.

Figure 2:
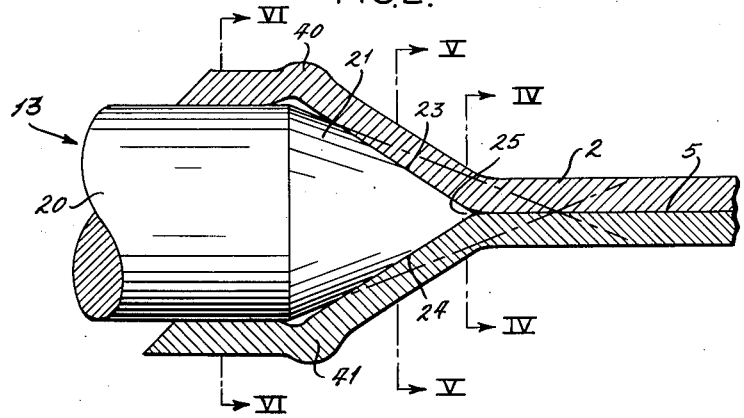
FIG. 2 is an enlarged side elevational view partly in section of the punch or needle shown entered into a panel to form an opening.
Figure 3:
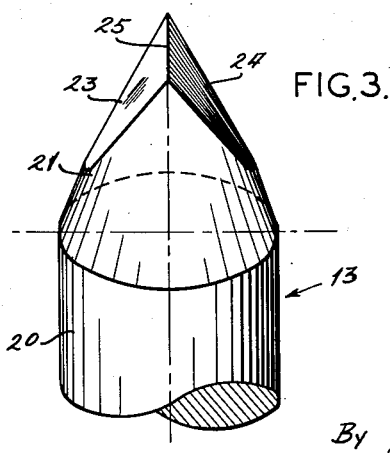
FIG. 3 is a perspective, semi-diagrammatic view showing construction of the front end of the punch.

In FIGURE 2 punch 13 is shown partially entered into the panel 2 at extension 5. It will be noted that the punch consists of a cylindrical portion 20, a conical portion 21 and a pair of flats 23 and 24 intersecting at the leading edge 25. Cone 21 preferably has an included angle at the apex of about 40°, i.e. a generating angle of 20°. Conical portion 21 can be more blunt but the included angle at the apex should be less than 90° preferably. As shown from another view in FIGURE 3, the flat portions 23 and 24 are parts of elliptical sections intersecting at edge 25 inasmuch as the plane of each flat intersects with the axis of the punch at a more obtuse angle, preferably not in excess of 45°, than the generating elements of the conical portion 21. Thus, the transverse leading edge 25 is shorter than the diameter of cylindrical portion 20 which forms the base of conical section 21 which, in turn, is of somewhat lesser diameter than the diameter of the fully distended extension 5.

As illustrated in FIGURE 4 the length of entering edge 25 is considerably less than the width (about 0.375 of an inch) of extension 5 of the separation material of panel 2 (about 0.062 of an inch in gauge). This view shows a punch having a diameter of about 0.170 of an inch at cylindrical section 20. This permits the sharp edge 25 to initiate separation of the lips 40 and 41 on each side of the extension of the separation at the laminated portion of panel 2. Edge 25, inasmuch as it is neither a point nor an edge of length closely approaching the width of the interface between lips 40 and 41, is self-orienting with respect to these lips and penetrative with respect to the stop-weld layer at the parting line 5 without being penetrative to the material of lips 40 and 41. As shown in FIGURE 2, flats 23 and 24 serve to spread the lips 40 and 41 at an angle such that the material of these lips during entry of the punch deforms and moves freely with respect to the cylindrical remainder 20 of the punch which follows. At the lateral extremities of edge 25 and back of them, opposite sides 47 and 48 (FIGURE 8) of conical portion 21 serve to permit extension 5 to open smoothly laterally in a manner comparable to the way the flats 23 and 24 permit opening in a direction transverse to the edge 25. Thus, no interference occurs either with the lateral extremities or corners of the separation extension 5 or with the intermediate portions of lips 40 and 41. Because of the metal deformation worked by the flats 23 and 24, practically none of the energy required to drive the punch is lost in friction between the cylindrical portion 20 of the punch and the surrounding lip portions 40 and 41 of the opening of panel 2.

As the entry of the punch proceeds, larger and larger cross sectional portions of conical portion 21 of the punch are presented laterally in the inlet 5 until eventually the base of the conical portion followed by the cylindrical portion 20 is presented over substantially the entire or major part of the internal surface between the fully opened lips 40 and 41. This progressive action is shown in three successive stages in FIGURES 4, 5 and 6, in the latter of which the cylindrical portion 20 of the punch is shown to be sufficiently smaller than the maximum diameter of the inlet opening so as to leave two open corners 45 and 46 at the lateral edges. These open corners remain to be closed when an inflation needle of a diameter of about 0.176 of an inch is finally to be applied with a sealing fit.

Another form of point profile is shown in FIGURE 7. Here the front end of cylindrical section 60 is provided with a conical portion 61 having a leading edge 65 formed by the intersection of flats 63 and 64. In this embodiment the flats are parallel to a generating element of the conical portion 61, and intersect at an included dihedral angle of about 40° found quite effective with aluminum panels having a gauge in the vicinity of about 0.062 of an inch. The entering action of this embodiment of point is substantially identical with that of the previous embodiment shown specifically in detail in FIGURES 2–6. Conical portion 61 in this embodiment of the punch has opposite sides 67 and 68 (FIGURE 9) at the lateral extent of edge 65 which serve like sides 47 and 48 of the previous embodiment to accomplish desirable opening of the lateral direction. This second form of punch is characterized by a sharper edge 65 and is more suitable for opening panels of less readily deformable material such as stainless steel.

The principle of the construction of the special needle and features in common are best shown in FIGURES 8 and 9 when compared. Each punch has a leading edge (25 and 65), each has the opposing, converging flats (23, 24, and 63, 64), and each has a conical portion having opposing lateral sides (47, 48 and 67, 68).

From the foregoing it is evident that the leading edge may vary from a blunt ridge to a relatively sharp one.

While both of the foregoing embodiments have been described to have a cylindrical after-portion, such as portions 20 and 60, it will be understood that this portion merely forms a support for the base of the conical portion of the punch and may, for example, take the form of a rod of lesser diameter than the base of the cone. In this latter embodiment, the base of the conical section is ordinarily connected with the supporting rod by means of a filet section which gradually merges with the supporting rod for adequate strength.

Although embodiments now believed to be preferred have been shown and described, it is to be understood that changes and modification may occur to those skilled in the art without departing from the spirit and scope of this invention as set forth in the appended claims without limitation to the illustrative embodiments described.

What I claim is:

1. The method of effecting an opening at a lateral edge portion of a partially laminated sheet of ductile metal by separating the component laminations thereat which comprises presenting the transverse leading edge of a punch thereat, said leading edge being shorter than said laminated edge portion and being presented in substantial alignment therewith, and driving in said punch in short increments of penetration under a force having a magnitude, both, requiring at least about 40 impact blows per inch of penetration and so that each of said increments of penetration does not exceed 0.025 of an inch for each of said blows.

2. The method of effecting an opening at an exposed parting line at an edge portion of an inflatable partially laminated sheet of ductile metal at least one laminated portion of which extends to said parting line, which comprises presenting the transverse edge of a punch followed by a conical portion to said parting line in alignment therewith, said edge being substantially shorter than said parting line, and driving in said punch under a force having a magnitude, both, requiring at least 40 impact blows per inch of penetration and so that said punch enters into the sheet between the laminations exposed at said edge portion in short increments having a magnitude not exceeding 0.025 of an inch.

3. The method of claim 2 wherein the punch is driven under a force having a magnitude requiring from about 40 impact blows to about 70 impact blows of said force for a penetration of about an inch.

4. The method of claim 2 wherein the punch is driven at a rate of from about 10,000 blows per minute to about 1500 blows per minute.

5. The method of claim 2 wherein the punch is driven at a rate of the order of about 8400 blows per minute.

6. The method of claim 2 wherein said punch is driven with supersonic frequency.

7. The method of effecting an opening at an exposed parting line at an edge portion of an inflatable partially laminated sheet of ductile metal, the laminations of which are disposed inwardly from the peripheral edge portions of the sheet except at said parting line which comprises presenting in substantially parallel relationship with respect to said parting line a transverse leading edge of a punch having a conical forepart following said edge and having two opposed flats intersecting with each other at said transverse edge to said parting line having a length substantially in excess of that of said transverse edge, and driving in said punch with vibratory motion under a force having a magnitude, both, requiring at least 40 impact blows per inch of penetration and so that each of said increments of penetration does not exceed 0.025 of an inch for each of said blows.

8. The method of effecting an opening at an exposed parting line at an edge portion of a partially laminated sheet of ductile metal with said laminations disposed inwardly of the peripheral edge portions of said sheet except at said parting line which comprises, applying an opening means to said parting line with said means having dimensions small enough to be inserted in the laminations extending into said sheet from said parting line, applying a force to said means of sufficient magnitude to effect separation of the component laminations extending from said parting line while interrupting the application of said force to said means at a rate equal to at least 40 times for each inch of penetration of said means between said component laminations, and directing said means between said component laminations to form said opening.

References Cited in the file of this patent
UNITED STATES PATENTS

| | | |
|---|---|---|
| 677,930 | Burton | July 9, 1901 |
| 841,388 | Gapp | Jan. 15, 1907 |
| 1,887,168 | Rauberstrauch | Nov. 8, 1932 |
| 1,966,446 | Hayes | July 17, 1934 |
| 2,124,024 | Alkin | July 19, 1938 |
| 2,454,326 | Makenny | Nov. 23, 1948 |
| 2,662,273 | Long | Dec. 15, 1953 |
| 2,740,188 | Simmons | Apr. 3, 1956 |
| 2,756,487 | Heidorn | July 31, 1956 |